United States Patent [19]

Seuster

[11] Patent Number: 4,650,361

[45] Date of Patent: Mar. 17, 1987

[54] JOINT FOR TRUSS STRUCTURES OF FIBER COMPOSITE MATERIAL

[75] Inventor: Walter Seuster, Friedrichshafen, Fed. Rep. of Germany

[73] Assignee: Dornier System GmbH, Friedrichshafen, Fed. Rep. of Germany

[21] Appl. No.: 685,349

[22] Filed: Dec. 24, 1984

[30] Foreign Application Priority Data

Dec. 24, 1983 [DE] Fed. Rep. of Germany ....... 3346922
Feb. 22, 1984 [DE] Fed. Rep. of Germany ....... 3406288

[51] Int. Cl.⁴ .......... F16C 11/04
[52] U.S. Cl. .......... 403/24; 403/4; 403/146; 343/915; 343/916; 52/81; 248/286
[58] Field of Search .......... 343/915, 916, 912, 840; 403/3, 4, 24, 146; 52/81; 248/286

[56] References Cited

U.S. PATENT DOCUMENTS

| | | | |
|---|---|---|---|
| 2,717,141 | 9/1955 | Livingston | 403/146 |
| 3,392,398 | 7/1968 | Bowditch | 343/915 |
| 3,401,390 | 9/1968 | Braccini et al. | 343/915 |
| 3,715,850 | 2/1973 | Chambers | 248/286 X |
| 3,914,060 | 10/1975 | Miller et al. | 403/171 |
| 4,161,088 | 7/1979 | Gugliotta et al. | 403/176 X |

*Primary Examiner*—Cornelius J. Husar
*Assistant Examiner*—Joseph A. Fischetti
*Attorney, Agent, or Firm*—Hammond & Littell, Weissenberger & Dippert

[57] ABSTRACT

A joint connection for attachment of reflector panels at a truss support structure of a radio telescope, where the bars of the truss and the reflector panels consisting of fiber composite material, and adjusting means for the reflector panels between the ball-shaped central body of the joint and the reflector panels.

2 Claims, 10 Drawing Figures

JOINT FOR TRUSS STRUCTURES OF FIBER COMPOSITE MATERIAL

The invention relates to a joint connection for attachment of reflector panels in a truss support structure of a radio telescope, the truss bars and the reflector panels consisting of carbonfiber-reinforced plastics (CFK, carbonfiber composite).

BACKGROUND OF THE INVENTION

For a joint connection of this kind the following requirements are set:

High rigidity,

Separability for repeated knockdown and erection of the truss structure,

Low thermal expansion,

Low weight,

Secure suspension for the panels and for a support structure of a sub-reflector, Low introduction of moments at the joint through the panel suspension, Low introduction of moments into the panels through the suspension and, Easy installation of the panels and ready accessibility to the adjusting members.

OBJECTS OF THE INVENTION

It is an object of the invention to provide a joint connection which is suitable for truss structures of fiber composite materials and which permits at the same time good adjustability of the reflector panels, so that after a single adjustment readjusting is necessary only after long intervals of time.

Other objects and advantages of the invention will become apparent as the description thereof proceeds.

DETAILED DESCRIPTION OF THE INVENTION

In accordance with the present invention, the above object is achieved by a joint connection for the attachment of reflector panels on a truss support structure of a radio telescope, where the bars of the truss and the reflector panels consist of fiber composite material or metal, comprising a ball in which bolts are fastened to the bars made of fiber composite materials by means of a screw connection, so that the bars are continuously under compressive stress; a bore in the ball in which by means of a screw bolt a cross plate is fastened; and bores in the cross plate for receiving a spring-loaded adjusting system which in turn is screwed to the reflector panels.

Figure 1:
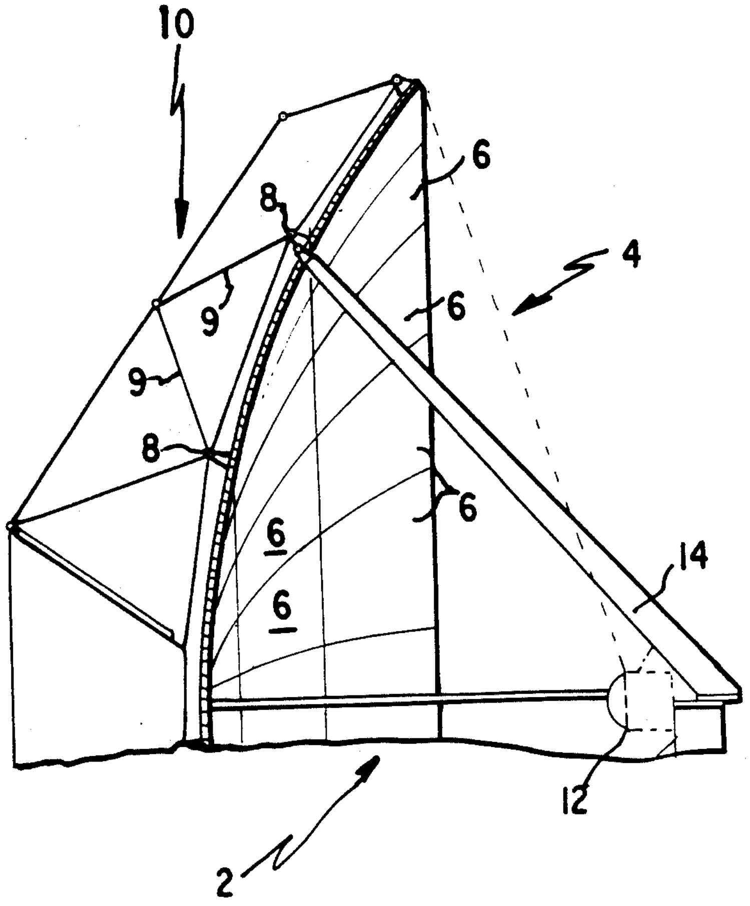
FIG. 1 shows the truss support structure of a radio telescope.

FIG. 1 shows the principle of a truss support structure of a radio-telescope. The main reflector 4 consists of panels 6, which are mounted on a truss support structure 10 consisting of joints 8 and bars 9. A subreflector 12 is disposed in the main reflector 4; its struts 14 are braced at the joint 8.

Figure 2:
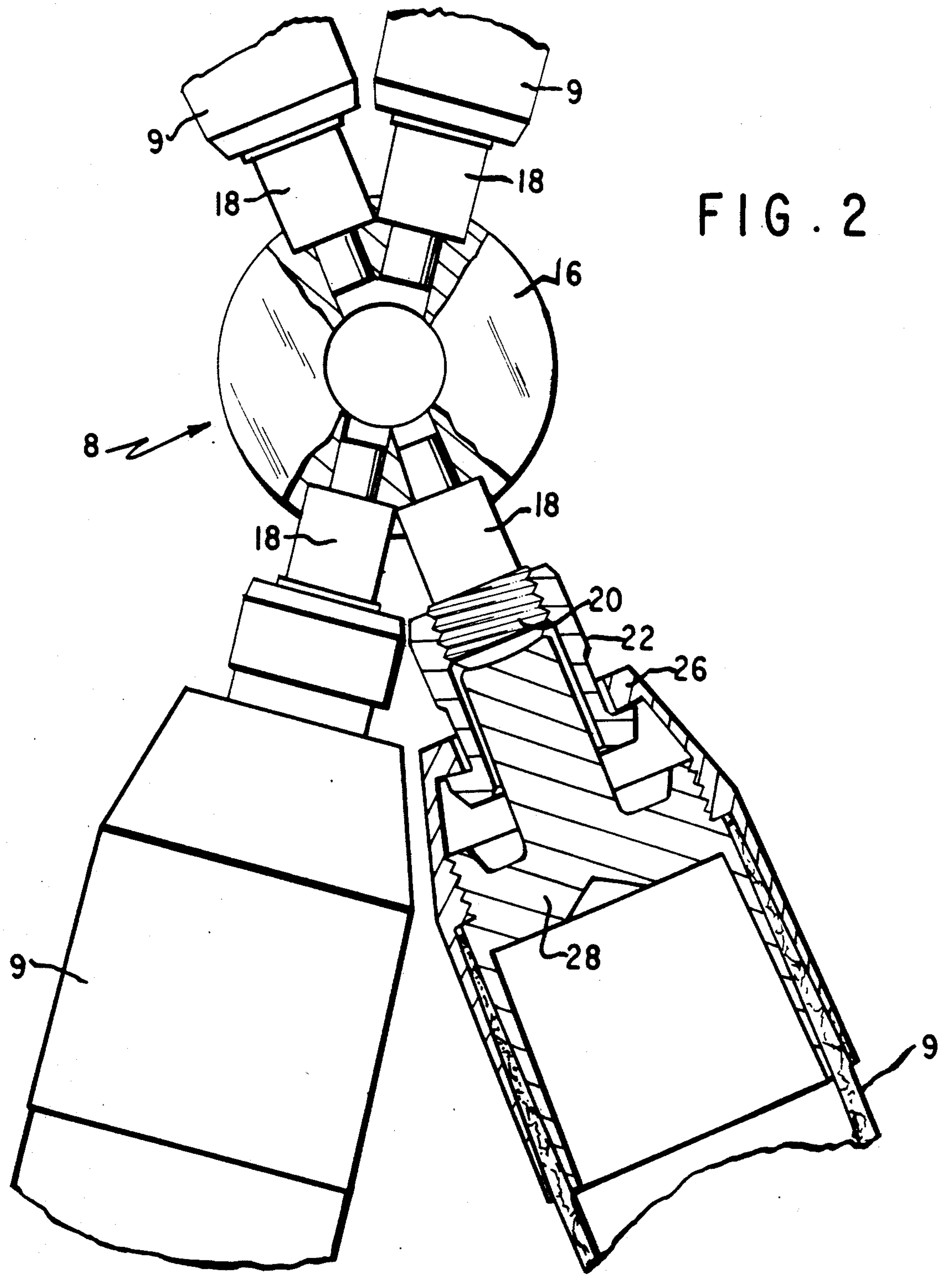
FIGS. 2 and 3 show the attachment of the truss at a joint.
Figure 3:
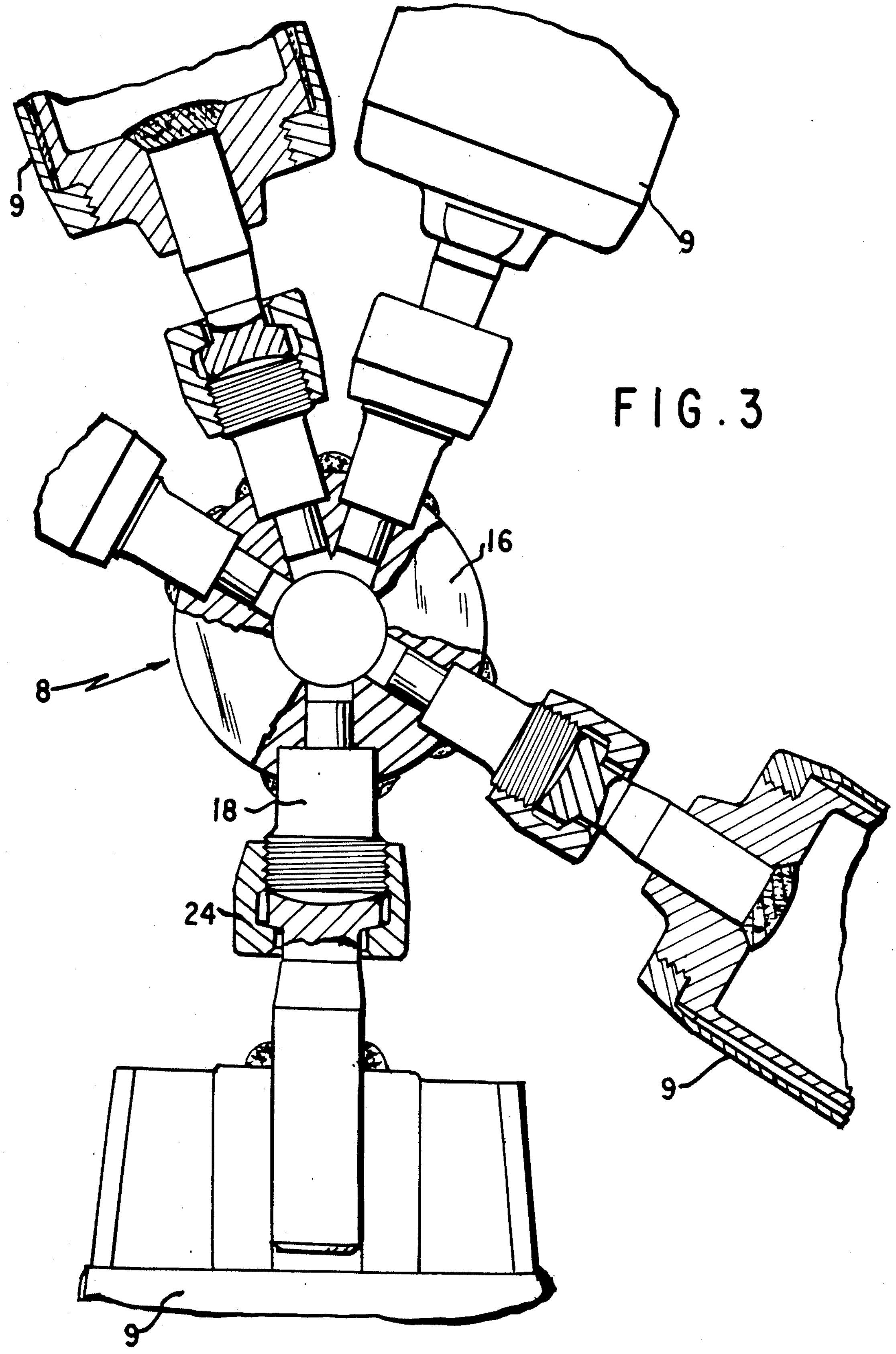
Figure 4:
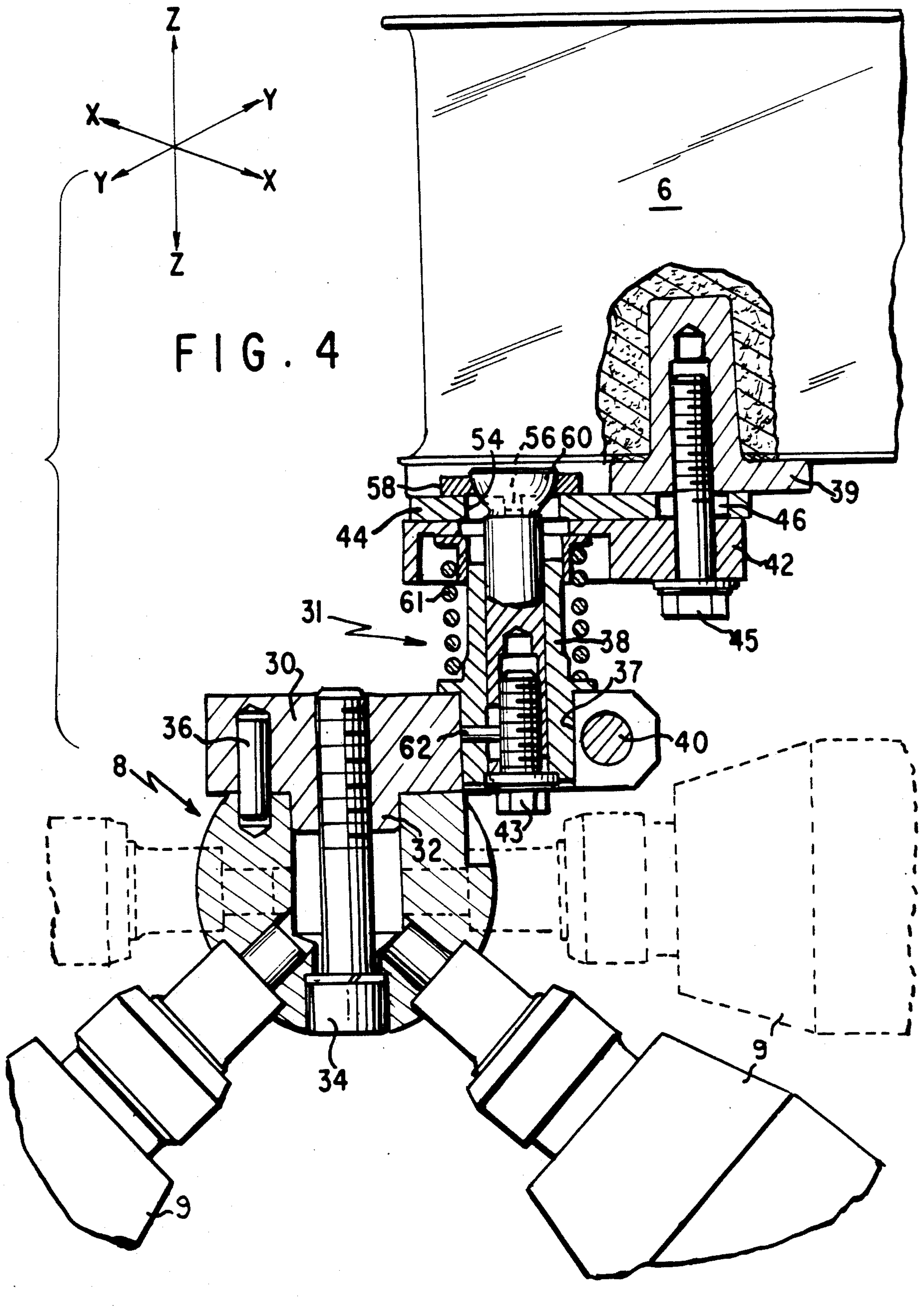
FIG. 4 is a sectional view of a joint connection with panel suspension.
Figure 5:
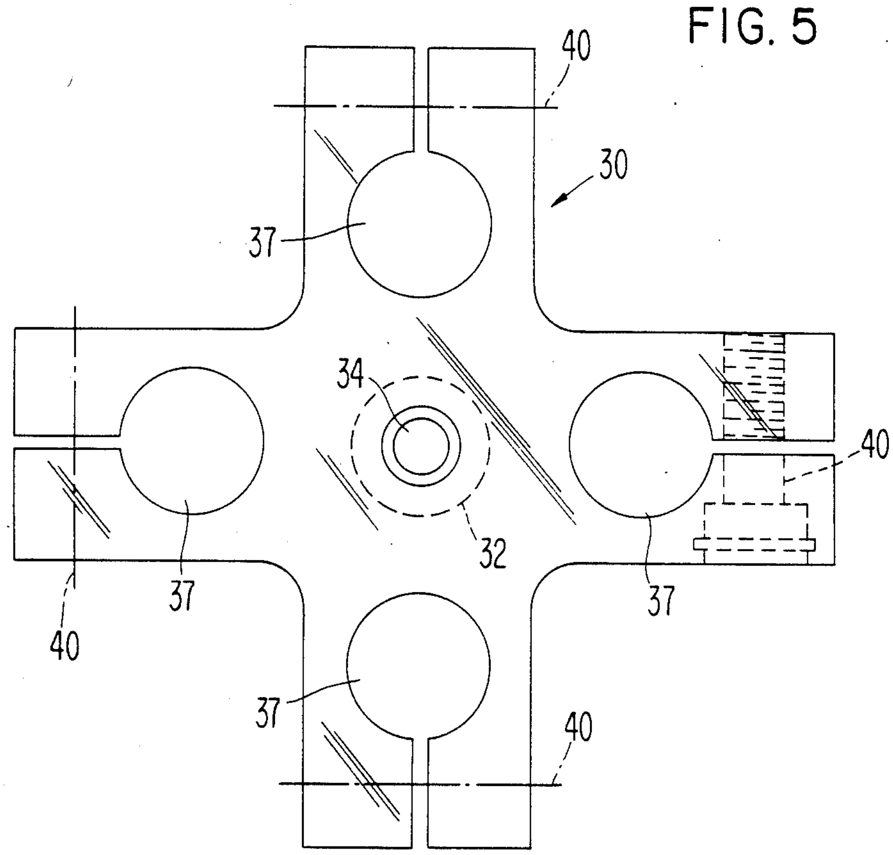
FIGS. 5 to 7 show details of the joint connection of FIG. 4.

The central piece, shown in FIGS. 2, 3 and 4, of a joint 8 is a spherical, double-cone-shaped or polygonal bolt 16, in which bolts 18 corresponding to the number of truss bars 9 coming together are inserted in the respective directions of the bars 9. The union between the hollow body 16 and bolts 18 is obtained, depending on the material and the load to be absorbed, by a weld, solder, shrinkfit, glue or screw connection (in the drawings fillet weld connections are shown).

At the endwall contact surfaces 20 of the truss bars 9, the bolts 18 are flat or barrel-shaped (hemispherical), depending on whether or not the angles for the truss bars 9 must be adjustable. Thereby a rigid mechanically or dynamically locking connection at the bar is possible (in FIGS. 2 and 3 a rigid dynamically locking connection is shown).

The truss connection (FIGS. 2 and 3) is effected by a screw and cap nut arrangement 22 and 24. The type of screw connection 22 shown in FIG. 2 results in a very stiff, prestressed bar connection in the direction of the bar, because the bar head elements 26 and 28, which are screwed together and glued to the bar consisting of fiber-reinforced material, are mounted under tensile or compressive stress.

A cross plate 30 with centering shoulder 32 (FIG. 4) is applied on the hollow body 8 and held in its position by a screw 34 and a dowel pin 36. Bores 37 in the cross plate 30 serve to receive panel bearing bushings 38, which are tightly clamped in the cross plate 30 by screw connection 40.

The struts 14 for the sub-reflector 12 may also be applied on the cross plates 30 as needed (not shown). Depending on geometric conditions (angle position of the strut legs), receiving bores 36 for the panel bearing bushings 38 must be provided at the respective cross plates 30. This causes an enlargement of the cross plates 30.

Figure 6:
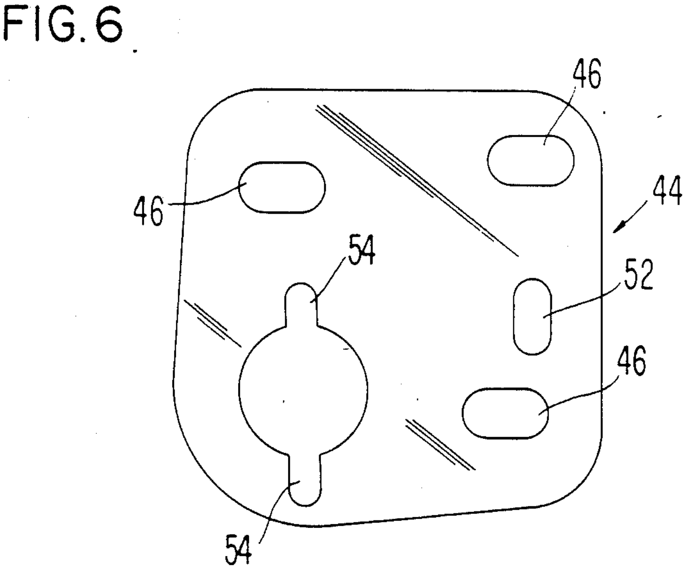
Figure 7:
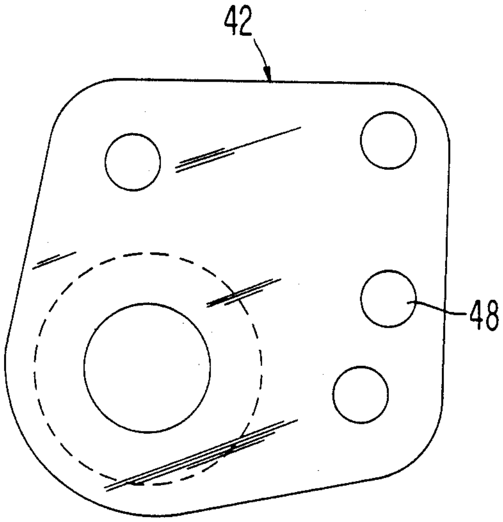

The adjusting system 31 is described below:

A base plate 39 and a clamping plate 42, connected by means of screws 45, are located at the bearing points of the segment-shaped panels 6. Between these two plates lies an adjusting plate 44 which, through slots 46 (FIG. 6), can be displaced relative to the plates 39 and 42 when the screws 43 are unscrewed, for instance with an eccentric wrench which is guided in a bore 48 of clamp plate 42 (FIG. 8) and engages by its eccentric pin into the slot 52 of adjusting plate 44. Through slots 54 this adjusting plate is connected by mechanical locking means with the projections 56 (FIG. 4) of a disk 58 which in turn is retained at the ball pin or bolt 60 in part mechanically locking and in part dynamically locking by the pressure of a spring 61, so that this disk 58 cannot be displaced in horizontal direction against the ball pin 60. Ball pin 60 is secured against rotation by a stud 62 and is adjusted against spring 61 by adjusting screw 43. Ball pin 60 has a femal thread 63 into which screw 43 engages. This arrangement results in the following possibilities of adjustment on the panels 6:

1. Horizontal adjustment (x- or y-direction) by displacement of clamp plate 44 (with an eccentric wrench);

2. Vertical adjustment (z-direction) by axial displacement of ball pin 60 by means of adjusting screw 43;

3. Free mobility of the panels relative to the truss structure due to expansion by heat and moisture in horizontal direction (x-y) by arrangement of the clamp plate 44 at the panel or by removal of the cams 56 at a disk 58.

Figure 8:
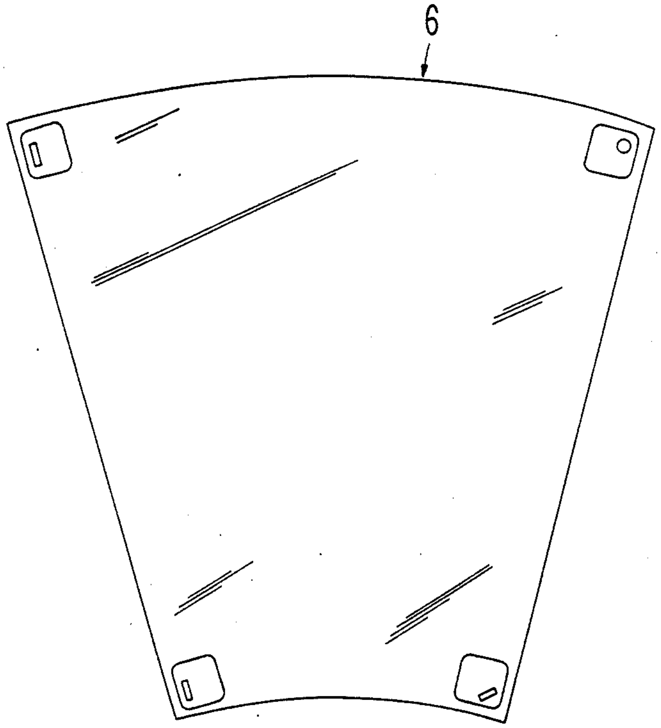
FIG. 8 is a top view of a reflector panel.

FIG. 8 shows a panel 6 of FIG. 1 in plain view, indicating the possibilities of displacement and adjustment of the pins 60. One sees the rectangular recesses in the panel, which permit displacement in one direction of movement and the position of the bearing freely movable in x-y direction.

Figure 9:
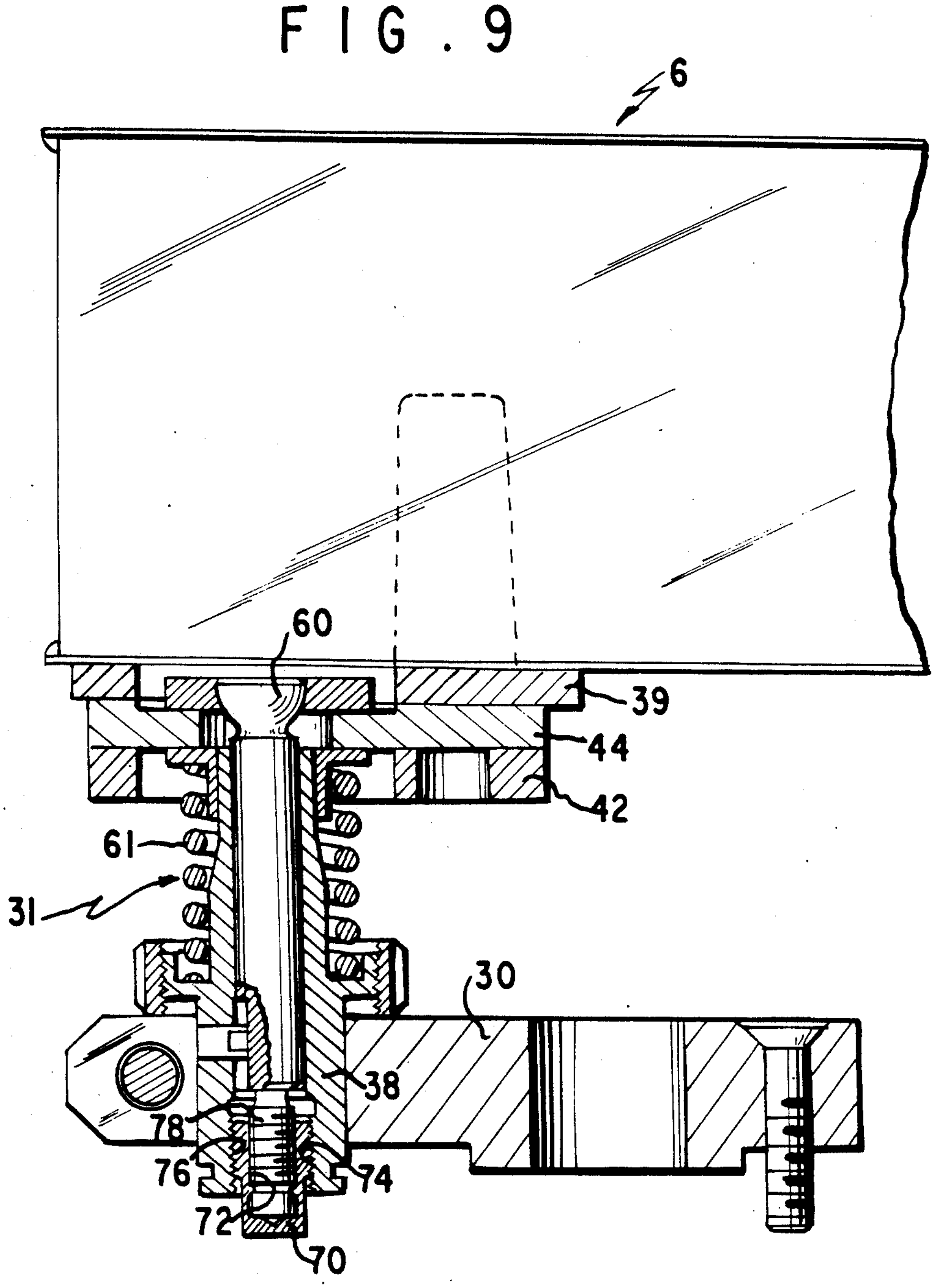
FIG. 9 is another embodiment of the joint of FIG. 4.

FIG. 9 shows another example of the adjusting system of FIG. 4.

In FIG. 9, the adjusting screw 43 of FIG. 4 is replaced by a differential screw 70. Differential screw 70 has a female thread 72 and a male thread 74. The male thread 74 engages in a thread position 76 of the panel bearing bushing 38, and the female thread 72 cooperates with a male thread portion 78 of ball pin 60. Now the pitches of the threads are matched so that upon rotation of screw 70 a differential effect on the advance of ball pin 60 results. By tightening or loosening screw 70 by small angles, a minute but exactly defined height displacement results at the ball pin.

Figure 10:
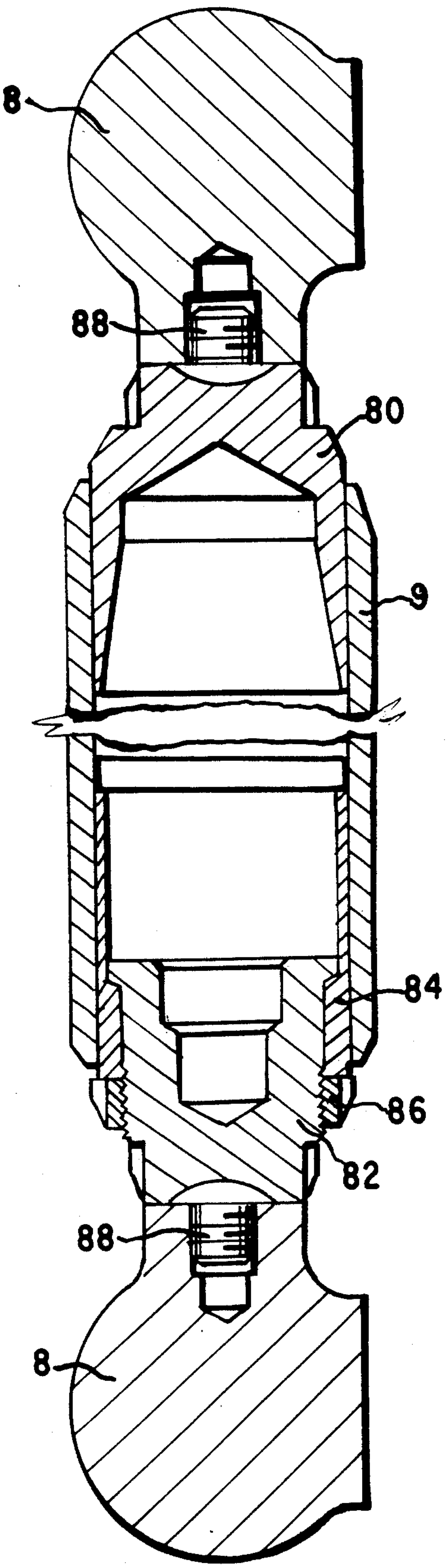
FIG. 10 is another embodiment of the connection of a bar with a joint.

FIG. 10 shows two joints of FIGS. 1-3, here formed as a ball or milled part. The ends 88 of bars 9 are screwed into into these parts. During installation, the bar is inserted between the fixed joints 8, and the bar head 80 is screwed into one parts 8. The screw portion 82 mounted in a sleeve 84 at the other bar end is for the most part contained inside bar 9 and is now pulled out of the bar and screwed to the other joint 8 (reference number 88). Thereafter, the cap nut 86 is tightened and clamped against sleeve 84 and bar 9.

While the present invention has been illustrated with the aid of certain specific embodiment thereof, it will be readily apparent to others skilled in the art that the invention is not limited to these particular embodiments, and that various changes and modifications may be made without departing from the spirit of the invention or the scope of the appended claims.

I claim:

1. A joint connection for the attachment of reflector panels to a truss support structure comprised of bars, wherein said bars and said reflector panels consist of fiber composite material or metal and wherein said joint connection comprises: (a) a ball in which are fastened bolts having ends attached to said bars by means of a screw connection to compressively stress said bars, said ball having a bore, and (b) a cross plate fastened through said bore by a screw bolt, said cross plate having bores for receiving a spring-loaded adjusting system which is connected by a screw to a reflector panel, said adjusting system consisting of (i) a panel bearing bushing having a bore in which is disposed a bolt having a shank and being provided with a reversely hemispherically-shaped head, said shank having a longitudinally directed female thread, (ii) an adjusting screw screwed into said female thread, (iii) a disk having a hemispherical recess which cooperates with said reversely hemispherically-shaped head, and (iv) a plate adjacent to said disk having attachment means for a reflector panel, said reversely hemispherically-shaped head being connected to said disk and said disk in turn being connected to an annular spring surrounding said panel bearing bushing and supported by a collar of said bushing, said disk comprising projections which fit into slots of said plate.

2. The joint connection of claim 1 wherein the reversely hemispherically-shaped head is connected to a differential screw arrangment which permits fine adjustment of the reflector panels.

* * * * *

UNITED STATES PATENT AND TRADEMARK OFFICE

CERTIFICATE OF CORRECTION

PATENT NO. : 4,650,361

DATED : March 17, 1987

INVENTOR(S) : WALTER SEUSTER

It is certified that error appears in the above-identified patent and that said Letters Patent is hereby corrected as shown below:

Column 1, line 41: "attachment of" should read -- attachment of bars of --.

Signed and Sealed this

Eighth Day of September, 1987

*Attest:*

DONALD J. QUIGG

*Attesting Officer* — *Commissioner of Patents and Trademarks*